US010720947B1

(12) United States Patent
Regadamilli et al.

(10) Patent No.: US 10,720,947 B1
(45) Date of Patent: Jul. 21, 2020

(54) DYNAMIC SPUR MITIGATION FOR WIRELESS SYSTEMS

(71) Applicant: QUALCOMM Incorporated, San Diego, CA (US)

(72) Inventors: Ravisankar Regadamilli, Hyderabad (IN); Rahul Shailesh Gaikwad, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/591,344

(22) Filed: Oct. 2, 2019

(51) Int. Cl.
*H04W 48/16* (2009.01)
*H04B 1/10* (2006.01)

(52) U.S. Cl.
CPC ... *H04B 1/1027* (2013.01); *H04B 2001/1063* (2013.01)

(58) Field of Classification Search
CPC . H04W 48/16; H04W 88/06; H04W 36/0085; H04W 48/20; H04W 24/10; H04W 48/18; H04B 1/1027; H04B 1/1036; H04B 2001/1045; H04B 2001/1063; G06F 3/044
See application file for complete search history.

(56) References Cited

U.S. PATENT DOCUMENTS

| | | | |
|---|---|---|---|
| 2002/0057751 A1* | 5/2002 | Jagger | H04B 1/1036 375/346 |
| 2014/0018070 A1* | 1/2014 | Ji | H04W 48/16 455/434 |
| 2017/0185213 A1* | 6/2017 | Wang | G06F 3/044 |
| 2019/0069229 A1* | 2/2019 | Lee | H04W 48/18 |
| 2019/0208399 A1* | 7/2019 | Wang | H04W 84/12 |

* cited by examiner

*Primary Examiner* — Thanh C Le
(74) *Attorney, Agent, or Firm* — Steven R. Thiel; Holland & Hart LLP

(57) ABSTRACT

Methods, systems, and devices for wireless communications are described. A device, which may be otherwise known as user equipment (UE), may support spurious emission attenuation. A device may determine, based on a first frequency scan on a radio frequency (RF) spectrum band, that a signal strength of a signal at a frequency of the RF spectrum band satisfies a threshold. The device may perform, based on the first frequency scan on the RF spectrum band, a second frequency scan on the RF spectrum band to determine whether the signal strength of the signal at the frequency of the RF spectrum band satisfies the threshold during the second frequency scan. Subsequently, the device may determine that the signal is a spurious emission at the frequency based on the signal strength of the signal, and configure a notch filter for mitigating the spurious emission at the frequency.

20 Claims, 11 Drawing Sheets

DYNAMIC SPUR MITIGATION FOR WIRELESS SYSTEMS

FIELD OF TECHNOLOGY

The following relates generally to wireless communications, and more specifically to spur identification and mitigation in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices. A communication device, which may be otherwise known as user equipment (UE) in a wireless communications system may experience undesired signals (also referred to as "spurious signals", "spurs", or "spurious emissions"), which may impact overall performance for the device. A device may filter undesired signals using a preconfigured filter design that may suppress the undesired signals at known frequency bands. However, preconfigured filter designs may fail to provide satisfactory use of system resources, as well as lack capabilities to suppress undesired signals at unknown frequency bands, therefore improved techniques are desired.

SUMMARY

The described techniques relate to improved methods, systems, devices, and apparatuses that support dynamically configuring a notch filter that mitigates one or more spurious emissions. A device may perform an initial scan (e.g., a shallow scan) of a radio frequency (RF) spectrum band to identify a spurious emission, followed by an additional scan (e.g., a deep scan) to confirm the spurious emission. By way of example, a device may perform an initial scan on an RF spectrum band and detect a possible spurious emission based on a signal strength of a signal at a frequency that satisfies a threshold (e.g., a noise threshold). Subsequently the device may perform a second scan to determine whether the signal strength of the signal at the frequency satisfies the threshold during the second frequency scan. The device may correlate and determine a spurious emission at the frequency based on the signal strength of the signal satisfying the threshold during one or more of the first frequency scan and the second frequency scan. To mitigate the spurious emission, the device may dynamically configure a notch filter (e.g., a depth (k) of a notch filter) to apply to the spurious emission. Accordingly, the described methods, systems, devices, and apparatuses provide techniques which may dynamically identify and mitigate spurious emissions, thereby reducing signal interference and enhancing device operation. Further, the described techniques may support dynamic configuration of notch filters (e.g., a software notch filter) for mitigating identified spurious emissions in real-time, without external interaction (e.g., user intervention).

A method of wireless communications at a first device is described. The method may include determining, based on a first frequency scan on an RF spectrum band, that a signal strength of a signal at a frequency of the RF spectrum band satisfies a threshold, performing, based on the first frequency scan on the RF spectrum band, a second frequency scan on the RF spectrum band to determine whether the signal strength of the signal at the frequency of the RF spectrum band satisfies the threshold during the second frequency scan, determining that the signal is a spurious emission at the frequency based on the signal strength of the signal satisfying the threshold during one or more of the first frequency scan and the second frequency scan, configuring a notch filter based on the spurious emission at the frequency, and receiving a transmission from a second device over the RF spectrum band based on the notch filter.

An apparatus for wireless communications is described. The apparatus may include a processor, memory coupled with the processor, and instructions stored in the memory. The instructions may be executable by the processor to cause the apparatus to determine, based on a first frequency scan on an RF spectrum band, that a signal strength of a signal at a frequency of the RF spectrum band satisfies a threshold, perform, based on the first frequency scan on the RF spectrum band, a second frequency scan on the RF spectrum band to determine whether the signal strength of the signal at the frequency of the RF spectrum band satisfies the threshold during the second frequency scan, determine that the signal is a spurious emission at the frequency based on the signal strength of the signal satisfying the threshold during one or more of the first frequency scan and the second frequency scan, configure a notch filter based on the spurious emission at the frequency, and receive a transmission over the RF spectrum band based on the notch filter.

Another apparatus for wireless communications is described. The apparatus may include means for determining, based on a first frequency scan on an RF spectrum band, that a signal strength of a signal at a frequency of the RF spectrum band satisfies a threshold, performing, based on the first frequency scan on the RF spectrum band, a second frequency scan on the RF spectrum band to determine whether the signal strength of the signal at the frequency of the RF spectrum band satisfies the threshold during the second frequency scan, determining that the signal is a spurious emission at the frequency based on the signal strength of the signal satisfying the threshold during one or more of the first frequency scan and the second frequency scan, configuring a notch filter based on the spurious emission at the frequency, and receiving a transmission over the RF spectrum band based on the notch filter.

A non-transitory computer-readable medium storing code for wireless communications at a first device is described. The code may include instructions executable by a processor to determine, based on a first frequency scan on an RF spectrum band, that a signal strength of a signal at a frequency of the RF spectrum band satisfies a threshold, perform, based on the first frequency scan on the RF spectrum band, a second frequency scan on the RF spectrum band to determine whether the signal strength of the signal at the frequency of the RF spectrum band satisfies the threshold during the second frequency scan, determine that the signal is a spurious emission at the frequency based on the signal strength of the signal satisfying the threshold during one or more of the first frequency scan and the second frequency scan, configure a notch filter based on the spurious emission at the frequency, and receive a transmission from a second device over the RF spectrum band based on the notch filter.

Some examples of the method, apparatuses, and non-transitory computer-readable medium described herein may further include operations, features, means, or instructions for dynamically configuring the notch filter based on determining that the signal is the spurious emission at the frequency.

Some examples of the method, apparatuses, and non-transitory computer-readable medium described herein may further include operations, features, means, or instructions for storing, to a frequency bin of a set of frequency bins, amplitude information associated with the signal at the frequency of the RF spectrum band during one or more of the first frequency scan and the second frequency scan, and comparing the stored amplitude information of the frequency bin of the set of frequency bins associated with the signal at the frequency of the RF spectrum band during the first frequency scan to additional amplitude information of an additional frequency bin of the set of frequency bins associated with the signal at the frequency of the RF spectrum band during the second frequency scan, where determining the spurious emission at the frequency may be based on the comparing.

Some examples of the method, apparatuses, and non-transitory computer-readable medium described herein may further include operations, features, means, or instructions for determining that the signal strength of the signal at a second frequency of the RF spectrum band satisfies the threshold during the second frequency scan, determining a frequency difference between the frequency and the second frequency, and determining that the frequency difference satisfies one or more of a second threshold and is within a bandwidth of the notch filter, where configuring the notch filter may be further based on one or more of the signal strength of the signal satisfying the threshold during one or more of the first frequency scan and the second frequency scan, and the frequency difference satisfying one or more of the second threshold and being within the bandwidth of the notch filter.

Some examples of the method, apparatuses, and non-transitory computer-readable medium described herein may further include operations, features, means, or instructions for attenuating the spurious emission at the frequency of the RF spectrum band using the notch filter.

Some examples of the method, apparatuses, and non-transitory computer-readable medium described herein may further include operations, features, means, or instructions for transforming the signal from a time domain to a frequency domain based on a transform operation, and performing the first frequency scan on the RF spectrum band based on the transforming.

Some examples of the method, apparatuses, and non-transitory computer-readable medium described herein may further include operations, features, means, or instructions for performing the second frequency scan based on transforming the signal from the time domain to the frequency domain.

Some examples of the method, apparatuses, and non-transitory computer-readable medium described herein may further include operations, features, means, or instructions for determining, based on the first frequency scan, that a signal strength of a second signal at a second frequency of the RF spectrum band satisfies the threshold, determining, based on the second frequency scan, that the signal strength of the second signal at the second frequency of the RF spectrum band is below the threshold, identifying the second signal as a second spurious emission at the second frequency based on one or more of the second signal satisfying the threshold during the first frequency scan and being below the threshold during the second frequency scan, and processing the second spurious emission using a baseband filter based on the identifying.

Some examples of the method, apparatuses, and non-transitory computer-readable medium described herein may further include operations, features, means, or instructions for determining one or more filter coefficients of the notch filter based on the frequency associated with the signal determined as the spurious emission and the signal strength of the signal, where configuring the notch filter may be further based on determining the one or more filter coefficients of the notch filter.

In some examples of the method, apparatuses, and non-transitory computer-readable medium described herein, configuring the notch filter may include operations, features, means, or instructions for configuring an attenuation level based on the one or more filter coefficients of the notch filter.

DETAILED DESCRIPTION

Figure 1:
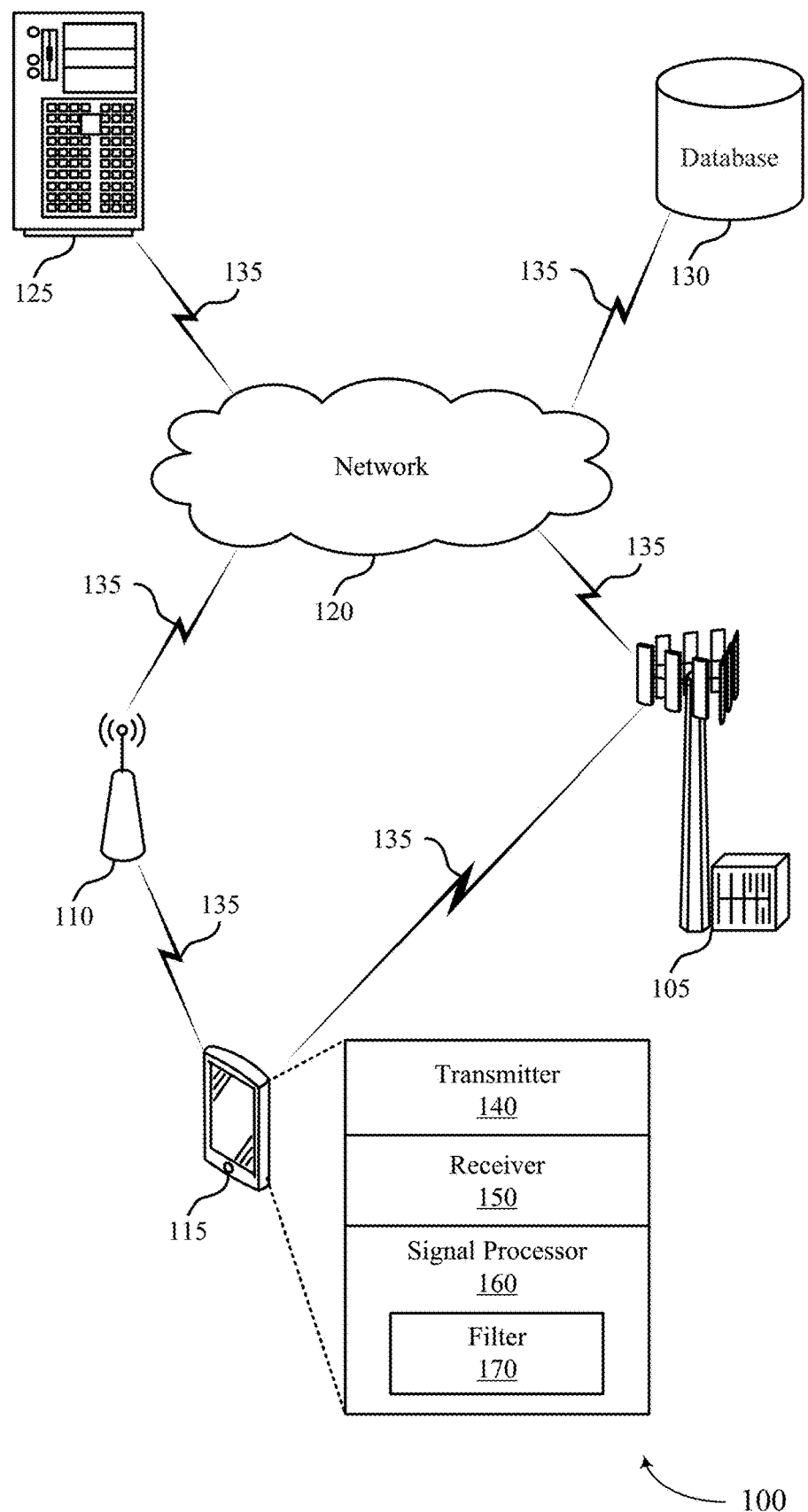
FIG. 1 illustrates an example of a system for wireless communications that supports spur identification and mitigation in wireless communications systems in accordance with aspects of the present disclosure.

A device in a wireless communications system may experience undesired signals (e.g., spurious emissions), which may impact overall performance for the device. In some examples, static spurs may be generated by sources external or external to a device. For example, static spurs may be generated by a device itself, a technology aggressor in a vicinity of the device (e.g., a transmitting device, a power supply, etc.), a noise source, an activity of a vehicle, and the like. In some examples, the presence of spurs may degrade a quality of signals received by a device, and can thus impact performance of the device. To reduce or mitigate impact of spurs to devices, some devices implement robust printed circuit board (PCB) layouts with mechanical shielding.

Some devices attempt to address spurious emissions via low-pass filters, high-pass filters, bandpass filters, and the like. For example, some devices may incorporate inductor-capacitor (LC) circuits (e.g., LC filters) having high quality factors (Q-factors) for known or expected spurs. However, such filters are difficult to tune, and additionally, result in the loss of valuable bandwidth, if the device cannot tolerate available baseband processing, capacitor-resistor-capacitor (CRC) filtering, etc. Some devices may address known or expected spurs using a baseband filter (e.g., band-stop filters, notch filters) having a constant filter coefficient value (e.g., a k-value). In some examples, some devices may implement notch filters both in software and hardware to assist in mitigating spurs which were unforeseen during the design stages of the devices.

Although generally effective, these devices may lack the capability for handling unexpected spurs in real-time (e.g., dynamically), for example, in cases where a spur is uncommon or bursty, or stems from an unknown or unexpected source. For example, uncommon or unexpected spurs may be experienced by a device when in an environment (e.g., around equipment using one or more frequency bands of an industrial, scientific and medical (ISM) radio band, such as the 2.4 GHz ISM band, an electromagnetic (EM) laboratory, a location in a vicinity of a test bench power supply, a joint test action group (JTAG) equipment, a signal generator, a router, a base station simulator, an automobile, etc.) or nearby any source producing a signal at a frequency within the bandwidth used by the device for operation (e.g., bandwidth used by the device for receiving transmissions). In some examples, some devices may filter undesired signals using a preconfigured notch filter design that may suppress the undesired signals at known frequency bands. These preconfigured notch filter designs may limit system resources (e.g., take up additional space on a printed circuit board (PCB) footprint), as well as lack capabilities to suppress uncommon and undesired signals at unknown frequency bands. Improved techniques are therefore desired.

Aspects of the subject matter described herein may be implemented to realize one or more advantages. The described techniques may support improvements in power savings, higher reliability, reduced interference, among other advantages. Aspects of the disclosure are initially described in the context of a wireless communications system. Aspects of the disclosure are further illustrated by and described with reference to apparatus diagrams, system diagrams, and flowcharts that relate to spur identification and mitigation in wireless communications systems.

FIG. 1 illustrates an example of a system 100 for wireless communications that supports spur identification and mitigation in wireless communications systems in accordance with aspects of the present disclosure. The system 100 may include a base station 105, an access point 110, a device 115, a server 125, and a database 130. The base station 105, the access point 110, the device 115, the server 125, and the database 130 may communicate with each other via network 120 using communications links 135 to support spur identification and mitigation related operations for dynamic filter configuration.

The base station 105 may wirelessly communicate with the device 115 via one or more base station antennas. Base station 105 described herein may include or may be referred to by those skilled in the art as a base transceiver station, a radio base station, a radio transceiver, a NodeB, an eNodeB (eNB), a next-generation Node B or giga-nodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115 over a relatively smaller area compared to the base station 105.

In some examples, the device 115 may be stationary or mobile. In further examples, the device 115 may include a cellular phone, a smartphone, a personal digital assistant (PDA), a wireless communication device, a handheld device, a tablet computer, a laptop computer, a cordless phone, a display device (e.g., monitors), or the like. The device 115 may, additionally or alternatively, include or be referred to by those skilled in the art as a UE, a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device (e.g., using a peer-to-peer (P2P) or device-to-device (D2D) protocol).

In some examples, the device 115 may include a transmitter 140, a receiver 150, and a signal processor 160. The transmitter 140 and the receiver 150 may be a combination of software and hardware configured for transmitting and receiving signals to and from one or more of base station 105 and access point 110. In some examples, the transmitter 140 and the receiver 150 may be separately integrated in the device 115 or may be combined, for example, such as a transceiver integrated with the device 115. The signal processor 160 may process signals received via the receiver 150 or process signals to be transmitted by the transmitter 140.

In some examples, the signal processor 160 may include a filter 170. The filter 170 may be a combination of software and hardware configured in the signal processor 160 that may remove one or more unwanted components or features from one or more signals received via the receiver 150. In some examples, the filter 170 may fully or partially suppress (e.g., attenuate) one or more aspects of one or more signals. For example, the filter 170 may be configured to remove (e.g., filter) signals associated with one or more frequencies or frequency bands. In some examples, the filter 170 may be a passband filter (e.g., a low-pass filter, a high-pass filter, a band-pass-filter, a comb-filter) or a stopband filter (e.g., a band-stop filter, a notch filter). The device 115 may therefore include one or more filters 170 designed to pass desired signals while reducing interference from other transmitters and noise sources (e.g., a transmitter associated with a different device 115, transmitters not associated with base station 105 and access point 110). For example, the device 115 may dynamically configure one or more filters 170 based on spurious emissions determined by the device 115. In some examples, signal processor 160 may include one or more filters 170 associated with different frequencies of an RF spectrum band, based on spurious emissions respectively associated with the different frequencies. Aspects of the filter 170 will be described further herein.

The device 115 may be configured with a capability to perform dynamic filter configuration for one or more spurious emissions associated with a frequency in a radio frequency band. In some examples, the device 115 may support the suppression of spurious emissions, and more specifically configuring a notch filter (e.g., filter 170) to mitigate the spurious emissions. In some examples, the device 115 may perform an initial scan (e.g., a shallow scan) of a frequency spectrum band to identify a spurious emission, followed by an additional scan (e.g., deep scan) to confirm the spurious emission. By way of example, the device 115 may perform a coarse initial scan on an RF spectrum band and detect a possible spurious emission based on a signal strength of a signal at a frequency that satisfies a threshold (e.g., a noise threshold). Subsequently the device 115 may perform a second scan to determine whether the signal strength of the signal at the frequency satisfies the threshold during the second frequency scan.

In some examples, the device 115 may transform the signal from a time domain to a frequency domain and perform the first and second frequency scans on the transformed signal. The device 115 may then correlate and determine that the signal is a spurious emission at the frequency based on the signal strength of the signal satisfying the threshold during one or more of the first frequency scan and the second frequency scan. The device 115 may therefore dynamically configure a notch filter (e.g., a depth (k) of the notch filter, such as the filter 170) to apply to (e.g., attenuate) the spurious emission. Additionally, the device 115 may identify spurious emissions having a signal strength below the threshold and process them using a baseband filter (e.g., a different filter 170).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The server 125 may include any combination of a data server, a cloud server, a server associated with a proxy server, an application server, a database server, a communications server, or any combination thereof. The server 125 may also transmit to the device 115, via the network 120, a variety of information, such as instructions, commands, or configuration information relevant to supporting operations for spur identification and mitigation. The configuration information may include, for example, filter configurations (e.g., filter type, filter frequency) of one or more filters 170 included in the signal processor 160.

The database 130 may store data that may include instructions, commands, or configuration information relevant to supporting spur identification and mitigation related operations for dynamic filter configuration. The device 115 may retrieve the stored data from the database 130 via the base station 105 and/or the access point 110. For example, upon receiving a request to provide a configuration file to device 115, server 125 may parse and retrieve the configuration file, from the database 130, based on the information provided in the request (e.g., configuration identifier, operating system type (e.g., Linux, Unix, Mac OS X, Windows, etc.) of device 115) and provide the configuration file to the device 115 via the communications links 135. The device 115 may receive the configuration file and apply it to a spur identification and mitigation related operation. For example, device 115 may apply the configuration file to the signal processor 160 to use in dynamically configuring the filter 170.

The communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115. The downlink transmissions may also be called forward link transmissions while the uplink transmissions may also be called reverse link transmissions. The communications links 135 may transmit bidirectional communications and/or unidirectional communications. The communications links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Particular aspects of the subject matter described herein may be implemented to realize one or more advantages. The system 100 may provide spur identification and mitigation techniques in to the device 115, which may support dynamic configuration of notch filters (e.g., software notch filters) for mitigating identified spurious emissions, among other advantages. According to aspects described herein, the notch filters may be dynamically configured in association with the identification of spurious emissions, and in some examples may have minimal impact on hardware resources, as well as minimal capacitance effects to a device. As such, the system 100 may support techniques for reducing a hardware footprint (e.g., a chip size), and accordingly, overall a device footprint, as the configurable notch filters may consume less PCB resources compared to static notch filters (e.g., hardware notch filters). The described techniques may also include features which may dynamically identify spurious emissions and configure notch filters for mitigating the identified spurious emissions, without user interaction.

Figure 2:
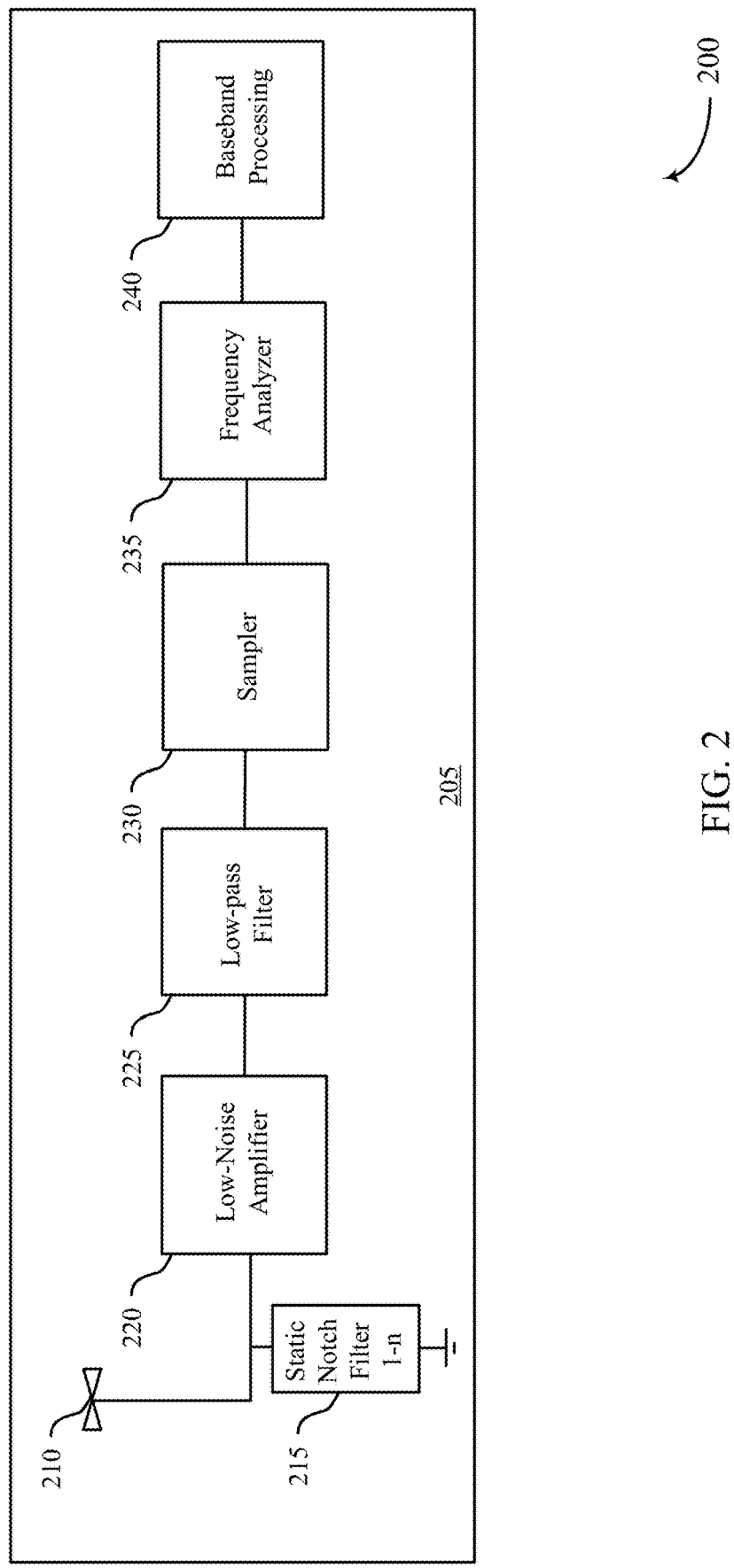
FIG. 2 illustrates an example of a receiver circuit that supports hardware and software notch filters in wireless communications systems in accordance with some devices.

FIG. 2 illustrates an example 200 of a receiver circuit 205 that supports hardware and software notch filters in wireless communications systems in accordance with some devices. Receiver circuit 205 may be an example of aspects of a device 115 as described herein. The receiver circuit 205 may include an antenna 210, a static notch filter 215, a low-noise amplifier (LNA) 220, a low-pass filter (LPF) 225, a sampler 230, a frequency analyzer 235, and baseband processing 240. The receiver circuit 205 may also include a processor. Each of these components may be in communication with one another (e.g., via one or more buses).

The antenna 210 may be internal or external to a device. The receiver circuit 205 may receive one or more signals corresponding to one or more frequencies of an RF spectrum band via the antenna 210. The static notch filter 215 may be implemented as hardware, software, or both. In an example, a PCB design for the device may include static notch filters 215 designed to mitigate known spurious emissions associated with environments in which the device may operate (e.g., known or expected spurious emissions from test equipment, signal generators, power supplies). In an example, the static notch filter 215 may have fixed L and C values (e.g., soldered L and C components on a PCB, static software notch filter configurations stored on a read only memory (ROM)) relating to an LC filter and designed for spurious emissions known to be constant (e.g., not changing with time or space).

The LNA 220 may be a variable gain amplifier. The LNA 220 may include an electronic amplifier capable of amplifying a relatively low-power signal without significantly degrading an associated signal-to-noise ratio. In an example, the LNA 220 may amplify a signal received via antenna 210 while minimizing additional noise. The LPF 225 may pass signals with a frequency lower than a cutoff frequency and attenuate signals with frequencies higher than the cutoff frequency. The LPF 225 may be, for example, a discrete-time filter, a continuous-time filter, or an electronic low-pass filter.

The sampler 230 may include an analog-to-digital converter (ADC). The ADC may convert any continuous-time and continuous-amplitude analog signals to discrete-time and discrete-amplitude digital signals. The frequency analyzer 235 may include a fast Fourier transform (FFT) block which may convert signals output from the sampler 230 from the time domain to the frequency domain, based on a transform operation. In some examples, the frequency analyzer 235 may perform a first frequency scan on the RF spectrum band based on the transforming. In some examples, the frequency analyzer 235 may provide the frequency spectrum associated with one or more data packets, with a spectral scan.

Baseband processing 240 may include one or more baseband filters (e.g., band-stop filters, notch filters) having a constant k-value configured to address known or expected spurs. In some examples, a number of static notch filters 215 may be preconfigured in the receiver circuit 205 (e.g., one or two per technology/path) due to a PCB footprint specification. Additionally, the static notch filters 215 may be incapable of being tuned to a different frequency or tuned dynamically. That is, the frequency values associated with the static notch filters 215 of the receiver circuit 205 are fixed and unchangeable. Therefore, the receiver circuit 205 may be unable to effectively, efficiently, or dynamically address any spurious emissions that occur after the receiver circuit 205 is designed and manufactured.

Figure 3:
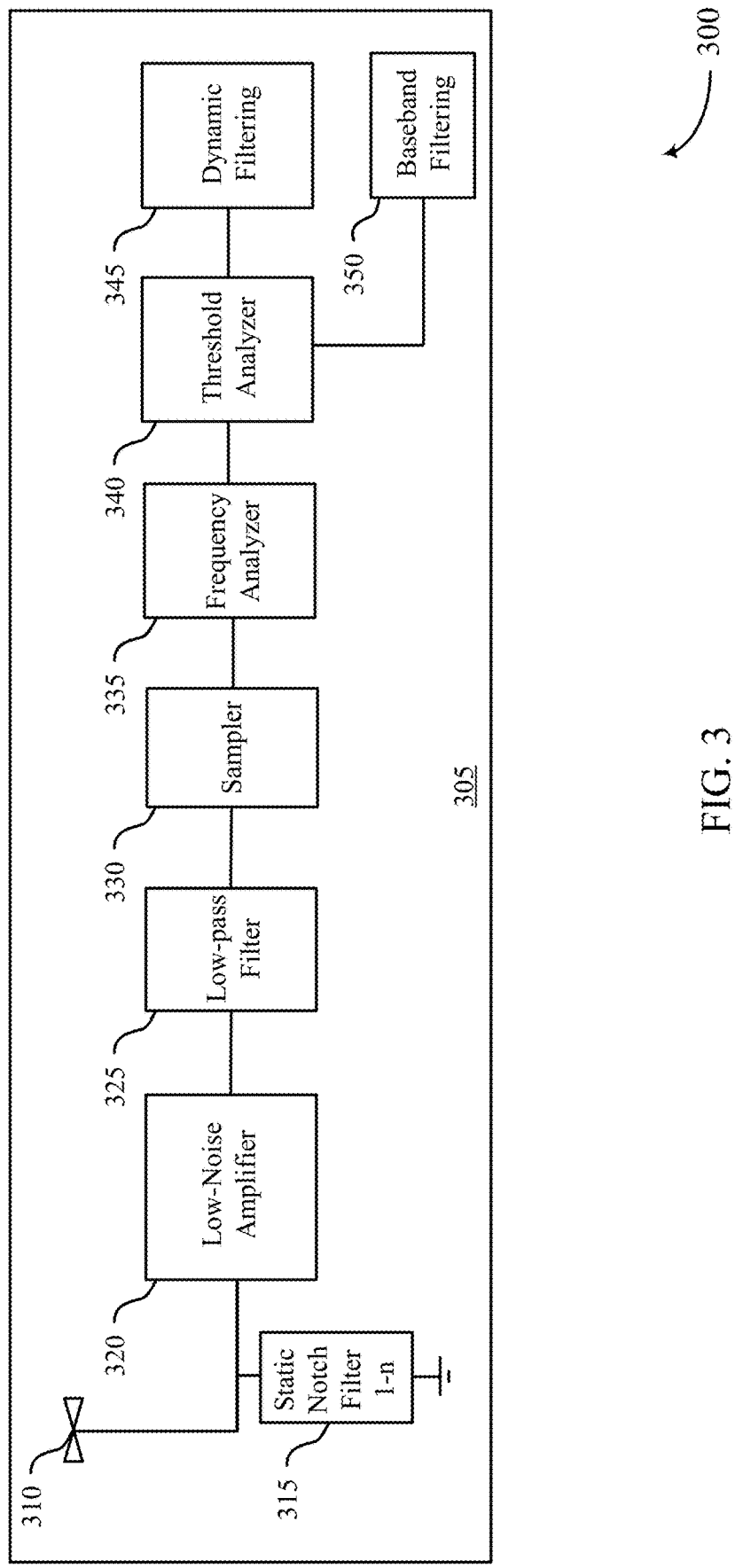
FIG. 3 illustrates an example of a receiver circuit that supports hardware filters and dynamic software filters in wireless communications systems in accordance with aspects of the present disclosure.

FIG. 3 illustrates an example 300 of a receiver circuit 305 that supports hardware filters and dynamic software filters according to aspects of the present disclosure. The receiver circuit 305 may be an example of aspects of a device 115 as described herein. The receiver circuit 305 may include an antenna 310, a static notch filter 315, an LNA 320, an LPF 325, a sampler 330, a frequency analyzer 335, a threshold analyzer 340, dynamic filtering 345, and baseband filtering 350. The receiver circuit 305 may also include a processor. Each of these components may be in communication with one another (e.g., via one or more buses).

Aspects of the antenna 310, static notch filter 315, LNA 320, LPF 325, sampler 330, frequency analyzer 335, and baseband filtering 350 of the receiver circuit 305 may be similar to those described herein with respect to the antenna 210, static notch filter 215, LNA 220, LPF 225, sampler 230, frequency analyzer 235, and baseband processing 240 of the receiver circuit 205, and detailed descriptions thereof will not be repeated herein.

The frequency analyzer 335 may include a fast Fourier transform (FFT) block, which may convert signals output from the sampler 330 from a time domain to a frequency domain, based on a transform operation. For example, the frequency analyzer 335 may perform a first frequency scan (and a second frequency scan) described herein on an RF spectrum band based on the transforming. For example, the frequency analyzer 335 may provide the frequency spectrum associated with one or more data packets, with a spectral scan. Further, the receiver circuit 305 may configure and integrate software notch filters that may be applied in real-time, dynamically.

In an example, at the threshold analyzer 340, the receiver circuit 305 may identify one or more spurs in a passband, and at the dynamic filtering 345, the receiver circuit 305 may mitigate the identified spurs to improve device performance. For example, at the threshold analyzer 340, the receiver circuit 305 may determine, based on a first frequency scan on an RF spectrum band, that a signal strength of a signal at a frequency of the RF spectrum band satisfies a threshold. In an example, at the threshold analyzer 340, the receiver circuit 305 may scan an RF spectrum band and determine signals having amplitudes higher than the threshold as suspected spurs. Further, the receiver circuit 305 may perform a second frequency scan (e.g., deep scan) to cross-check and confirm whether to declare the suspected spur as a spur having an amplitude above the threshold.

In some examples, at the threshold analyzer 340, the receiver circuit 305 may store declared spurs to frequency bins based on the respective frequencies associated with the spurs. In some examples, at the threshold analyzer 340, the receiver circuit 305 may perform, based on the first frequency scan on the RF spectrum band, a second frequency scan on the RF spectrum band to determine whether the signal strength of the signal at the frequency of the RF spectrum band satisfies the threshold during the second frequency scan, and determine that the signal is a spurious emission at the frequency based on the signal strength of the signal satisfying the threshold during one or more of the first frequency scan and the second frequency scan.

In some examples, as part of the second frequency scan (e.g., the cross check), at the threshold analyzer 340, the receiver circuit 305 may determine a frequency difference between a peak amplitude of the suspected spur determined from the first frequency scan (e.g., shallow scan peak) and a peak amplitude of the suspected spur determined from the second frequency scan (e.g., deep verify peak). Additionally, the receiver circuit 305 may determine whether the frequency difference satisfies a threshold (e.g., a bandwidth threshold). According to aspects described herein, the receiver circuit 305 may process the spur at baseband filtering 350 or dynamically configure a notch filter at dynamic filtering 345 according to a frequency and a k-value (notch depth) corresponding to the spur, based on the determining.

For example, at the threshold analyzer 340, when the receiver circuit 305 determines that a frequency difference between a peak amplitude of a suspected spur determined from a first frequency scan (e.g., shallow scan peak) and a peak amplitude of the suspected spur determined from a second frequency scan (e.g., deep verify peak) is greater than a bandwidth threshold, the receiver circuit 305 may process the spur, for example, at baseband filtering 350.

In an example, a bandwidth for notching a spur may be 0.2 MHz. The bandwidth may be determined based on, for example, user preferences, system specifications, etc. In an example, during a first frequency scan (e.g., shallow scan), at the threshold analyzer 340, the receiver circuit 305 may determine a suspected spur having a peak amplitude at 600 MHz, and during a second frequency scan (e.g., deep scan), determines the suspected spur to have a peak amplitude at 600.3250 MHz. The receiver circuit 305 may calculate the frequency difference as being equal to 0.3250 MHz, which is greater than a bandwidth threshold (e.g., 0.2 MHz). Accordingly, in some examples, the receiver circuit 305 may process the spur, for example, at baseband filtering 350.

Additionally or alternatively, at the threshold analyzer 340, when the receiver circuit 305 determines that a frequency difference between a peak amplitude of a suspected spur determined from a first frequency scan (e.g., shallow scan peak) and a peak amplitude of the suspected spur determined from a second frequency scan (e.g., deep verify peak) is equal to or lower than a bandwidth threshold, and the peak amplitude of the suspected spur (e.g., determined during one or more of the first frequency scan and the second frequency scan) is above an amplitude threshold, the receiver circuit 305 may dynamically configure and apply a notch filter at dynamic filtering 345 according to a frequency and a k-value (notch depth) corresponding to the spur.

In an example, during a first frequency scan (e.g., shallow scan), at the threshold analyzer 340, the receiver circuit 305 determines a suspected spur having a peak amplitude at 600 MHz, and during a second frequency scan (e.g., deep scan), determines the suspected spur to have a peak amplitude at 600.1250 MHz. The receiver circuit 305 may calculate the frequency difference as being equal to 0.1250 MHz, which is less than the bandwidth threshold (e.g., 0.2 MHz). Accordingly, in some examples, if the receiver circuit 305 has also determined that the suspected spur has an amplitude above an amplitude threshold (e.g., during one or more of the first frequency scan and the second frequency scan), the receiver circuit 305 may dynamically configure and apply a notch filter at dynamic filtering 345 according to a frequency and a k-value (notch depth) corresponding to the spur.

In some examples, at the threshold analyzer 340, the receiver circuit 305 may determine that the signal strength of the signal at a second frequency of the RF spectrum band satisfies the threshold during the second frequency scan, determine a frequency difference between the frequency and the second frequency, and determine that the frequency difference satisfies one or more of a second threshold and is within a bandwidth of the notch filter. In some examples, the receiver circuit 305 may configure the notch filter at dynamic filtering 345 based on one or more of the signal strength of the signal satisfying the threshold during one or more of the first frequency scan and the second frequency scan, and the frequency difference satisfying one or more of the second threshold and being within the bandwidth of the notch filter.

In some examples, at dynamic filtering 345, the receiver circuit 305 may initiate a notch finder algorithm to determine a k-value (notch depth) for attenuating the confirmed spur at the frequency determined by the receiver circuit 305 at the threshold analyzer 340 during the scan. For example, the receiver circuit 305 may configure a notch filter based on the spurious emission at the frequency and receive a transmission from a second device over the RF spectrum band based on the notch filter. In some examples, the receiver circuit 305 may attenuate the spurious emission at the frequency of the RF spectrum band using the notch filter. In some examples, the receiver circuit 305 may determine one or more filter coefficients of the notch filter based on the frequency associated with the signal determined as the spurious emission and the signal strength of the signal. In an example, the receiver circuit 305 may configure the notch filter further based on determining the one or more filter coefficients of the notch filter. In some examples, the receiver circuit 305 may configure an attenuation level based on the one or more filter coefficients of the notch filter.

For signals which the receiver circuit 305, at the threshold analyzer 340, identifies as having amplitudes lower than the threshold (e.g., either in the first frequency scan or second frequency scan), the receiver circuit 305 may apply identified coefficients at baseband filtering 350 according to a baseband notch filter algorithm (e.g., a conventional baseband notch filter algorithm). In an example, the receiver circuit 305 may treat (e.g., classify) the signals as spurs having amplitudes tolerable by the WLAN/BT radio, and may process the signals at baseband filtering 350.

For example, the receiver circuit 305 may determine, based on the first frequency scan, that a signal strength of a second signal at a second frequency of the RF spectrum band satisfies the threshold, and determine, based on the second frequency scan, that the signal strength of the second signal at the second frequency of the RF spectrum band is below the threshold. In some examples, the receiver circuit 305 may identify the second signal as a second spurious emission at the second frequency based on one or more of the second signal satisfying the threshold during the first frequency scan and being below the threshold during the second frequency scan, and, at baseband filtering 350, process the second spurious emission using a baseband filter based on the identifying.

Accordingly, at dynamic filtering 345, the receiver circuit 305 may configure one or more filters (e.g., notch filters) on the fly (e.g., in real-time) based at least in part on unknown, non-predetermined spurious emissions (e.g., based on detection and confirmation of a spur by the receiver circuit 305 at the threshold analyzer 340).

Figure 4A:
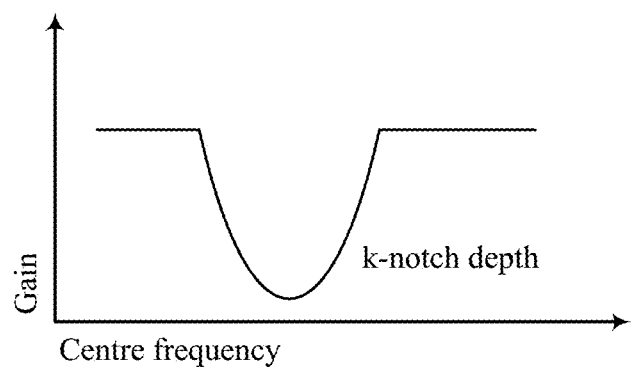
FIG. 4A illustrates an example of a notch filter configuration that supports spur identification and mitigation in wireless communications systems in accordance with aspects of the present disclosure.
Figure 4B:
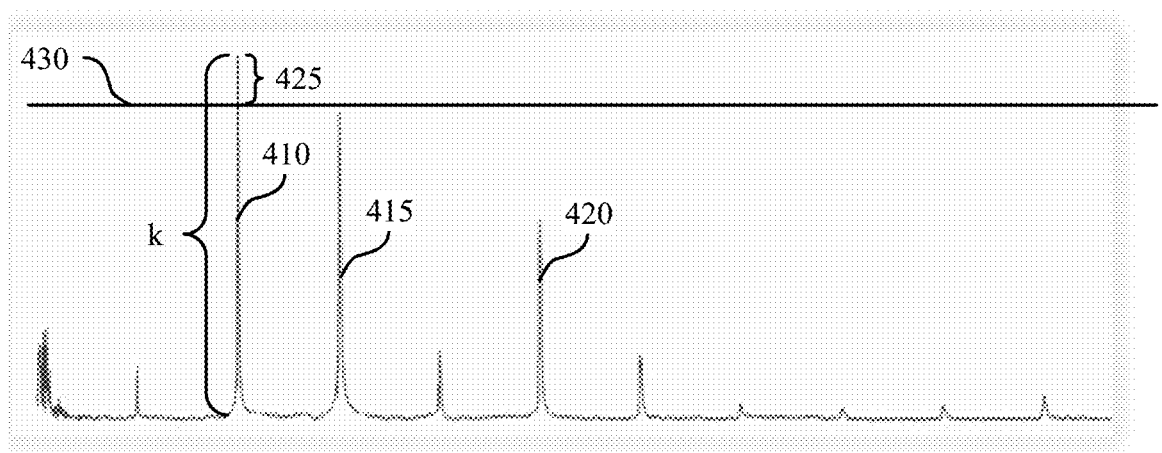
FIG. 4B illustrates an example diagram of a spurious emission in accordance with aspects of the present disclosure.
Figure 5:
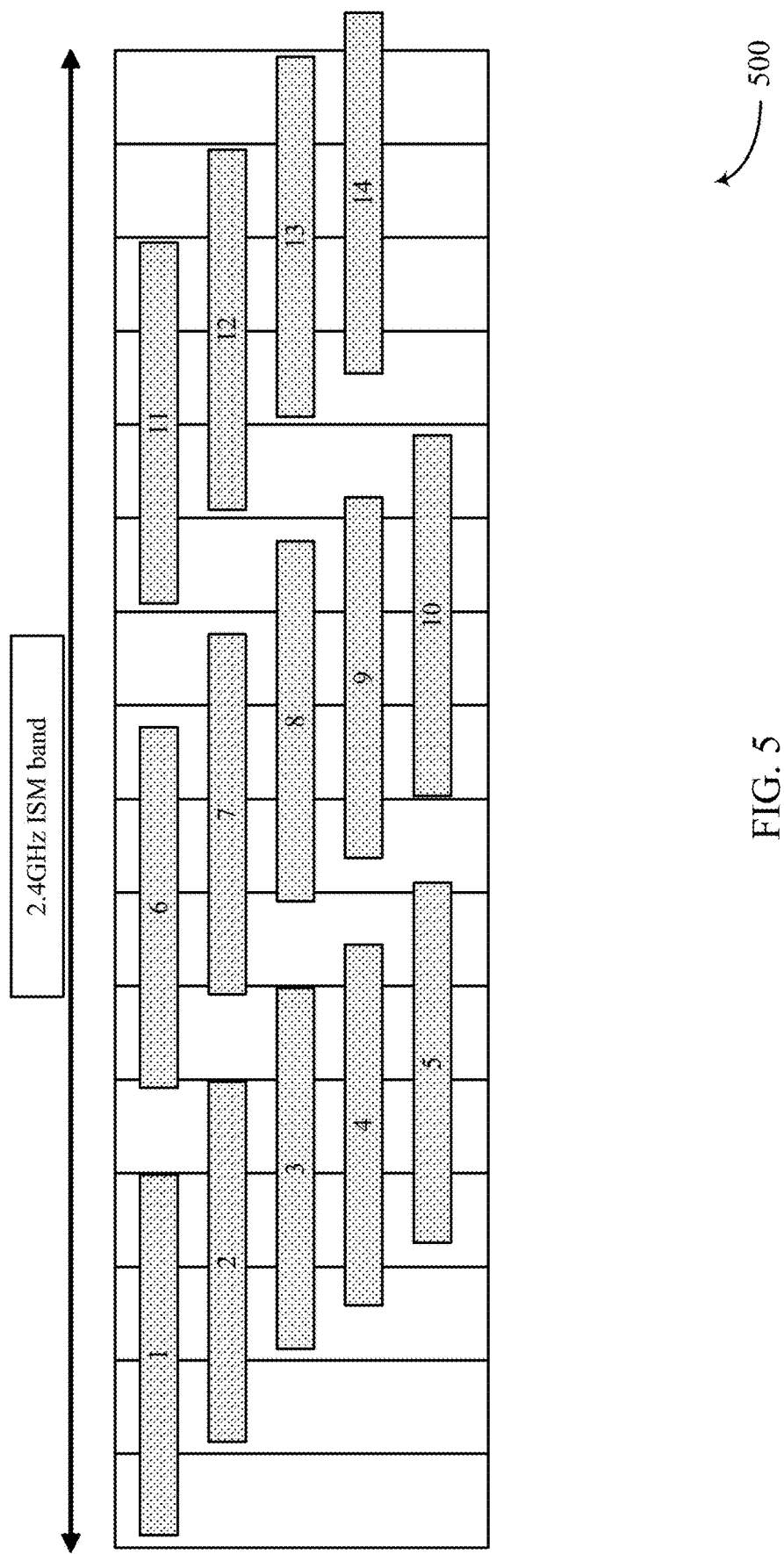
FIG. 5 illustrates an example of industrial, scientific and medical (ISM) radio bands in wireless communications systems in accordance with aspects of the present disclosure.

FIG. 4A illustrates an example notch filter configuration 400 that supports spur identification and mitigation in wireless communications systems in accordance with aspects of the present disclosure. FIG. 5B illustrates an example diagram 401 of a spurious emission in accordance with aspects of the present disclosure.

A device 115, as described herein, may determine, based on a first frequency scan on an RF spectrum band, that a signal strength of a signal 410 at a frequency of the RF spectrum band satisfies a threshold 430 (e.g., a noise threshold). For example, in the first frequency scan, the device 115 may analyze FFT bin equivalent waveforms (e.g., signals 410, 415, and 420) for suspected crossing of threshold 430. In an example described herein, the device 115 may determine to process signals 415 and 420, for example, using baseband processing, but may suspect signal 410 as a spurious emission. In some examples, the device 115 may determine signal 410 as a spurious emission based on a peak 425 of the signal 410 crossing the threshold 430. The device 115 may perform, based on the first frequency scan on the RF spectrum band, a second frequency scan on the RF spectrum band to determine whether the signal strength of the signal 410 at the frequency of the RF spectrum band satisfies the threshold during the second frequency scan.

For example, in the second frequency scan (e.g., deep scan), the device 115 may confirm (e.g., on the fly, dynamically) the suspected signal (e.g., signal 410) as a spurious emission. In an example, the device 115 may run an algorithm in parallel which may determine at which frequency bin the spurious emission corresponding to signal 410 crossed the threshold 430. In some examples, the device 115 may configure a notch filter based on the spurious emission at the frequency. For example, the device 115 may determine the depth (k) of a corresponding notch filter (e.g., in magnitude), and apply the notch filter in a next stage by filtering software (e.g., dynamic filtering 345). The device 115 may, for example, attenuate the spurious emission at the frequency of the RF spectrum band using the notch filter. According to aspects described herein, the techniques described herein may be applied to any algorithm developed in the future which includes error detection and correction, for example, for CRC filters which may generate an original signal even from a spurious emission.

Figure 6:
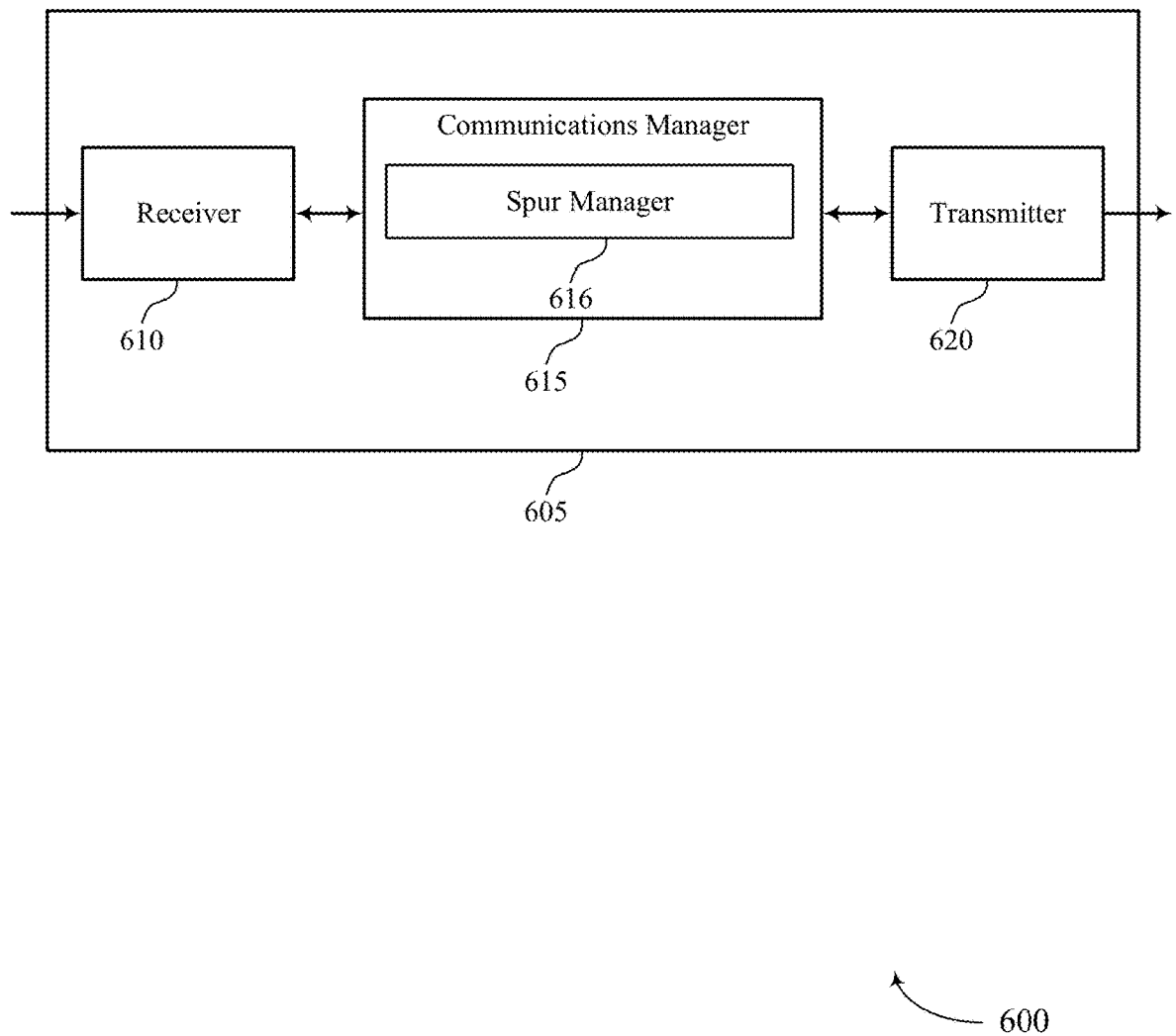
FIGS. 6 and 7 show block diagrams of devices that support spur identification and mitigation in wireless communications systems in accordance with aspects of the present disclosure.

FIG. 6 an example of industrial, scientific and medical (ISM) radio bands 600 in wireless communications systems in accordance with aspects of the present disclosure. In some examples, one or more bands within the ISM radio bands 500 may generate electromagnetic interference and disrupt communications to devices operating within a same band (e.g., frequency). By way of example, the ISM radio bands 500 may include sub-bands of a 2.4 GHz ISM band. Examples of devices that may operate according to one or more frequencies in the ISM radio bands 500 may include cordless phones, Bluetooth devices, near field communication (NFC) devices, etc. According to aspects described herein, with reference to FIG. 1, a device 115 operating in one or more bands of the ISM radio bands 500 may support hardware filters and dynamic software filters for mitigating any interference generated within the ISM radio bands 500.

Figure 7:
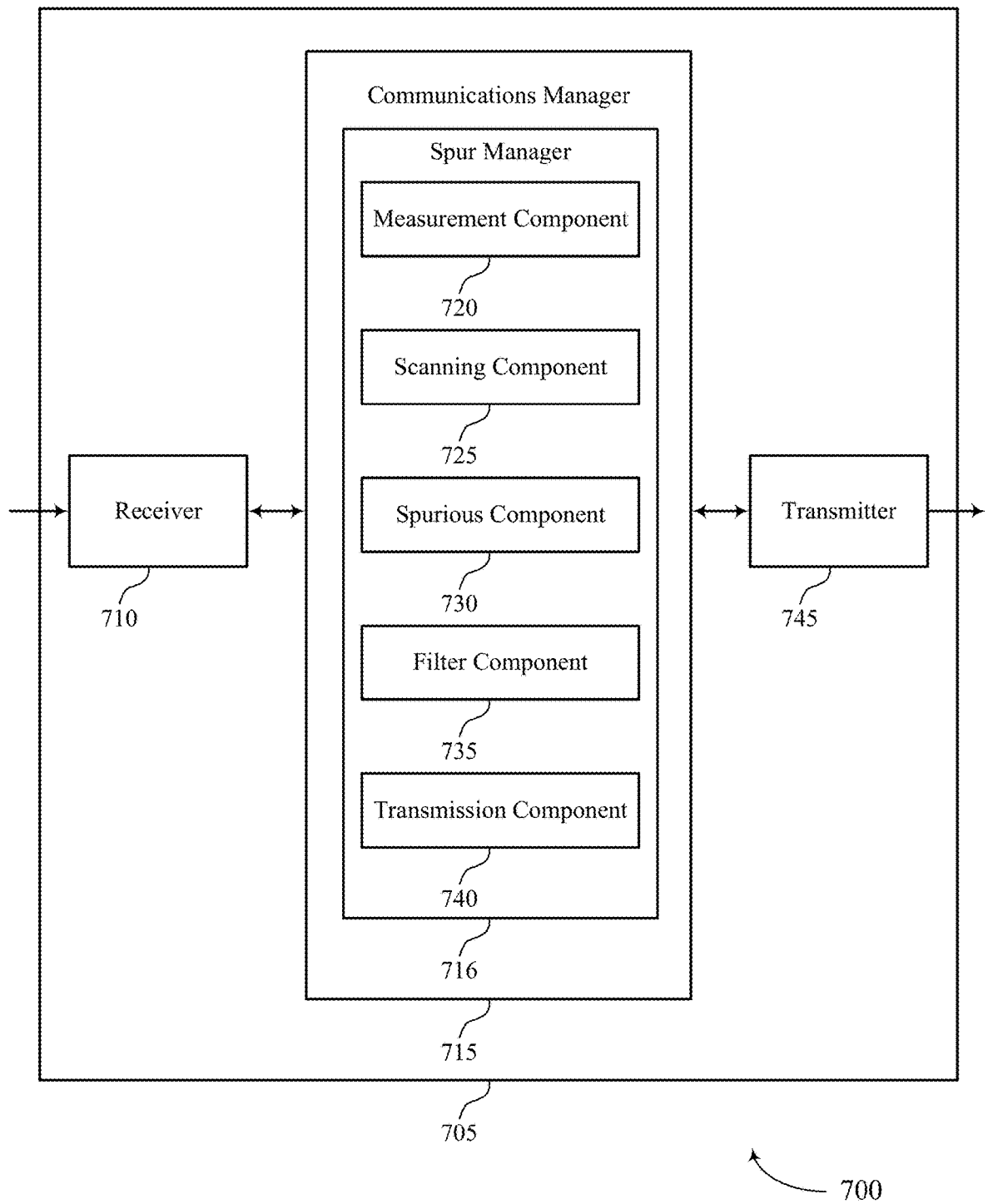

FIG. 7 shows a block diagram 700 of a device 705 that supports spur identification and mitigation in wireless communications systems in accordance with aspects of the present disclosure. The device 705 may be an example of, or implement aspects of, a device 115 as described herein. The device 705 may include a receiver 710, a communications manager 715, and a transmitter 720. The communications manager 715 may include a spur manager 716. The device 705 may also include a processor. Each of these components may be in communication with one another (e.g., via one or more buses).

The receiver 710 may receive information such as packets, user data, or control information associated with various information channels (e.g., control channels, data channels, and information related to spur identification and mitigation in wireless communications systems, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may determine (e.g., by the spur manager 716), based on a first frequency scan on an RF spectrum band, that a signal strength of a signal at a frequency of the RF spectrum band satisfies a threshold, perform, based on the first frequency scan on the RF spectrum band, a second frequency scan on the RF spectrum band to determine whether the signal strength of the signal at the frequency of the RF spectrum band satisfies the threshold during the second frequency scan, determine that the signal is a spurious emission at the frequency based on the signal strength of the signal satisfying the threshold during one or more of the first frequency scan and the second frequency scan, configure a notch filter based on the spurious emission at the frequency, and receive a transmission from a second device over the RF spectrum band based on the notch filter.

The communications manager 715 as described herein may be implemented to realize one or more advantages. One implementation may allow the device 705 to provide spur identification and mitigation techniques in wireless communications systems which may support dynamic configuration of notch filters (e.g., software notch filters) for mitigating identified spurious emissions, among other advantages. For example, the device 705 may include features for dynamically configuring the notch filters in association with the identification of spurious emissions. As such, the communications manager 715 may support techniques for reducing hardware resources and, in some examples, a device footprint of the device 705. The device 705 may also include features which may dynamically identify spurious emissions and configure notch filters for mitigating the identified spurious emissions, without manual input (e.g., operator input). The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a Field Programmable Gate Array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in FIG. 3 or another figure of the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
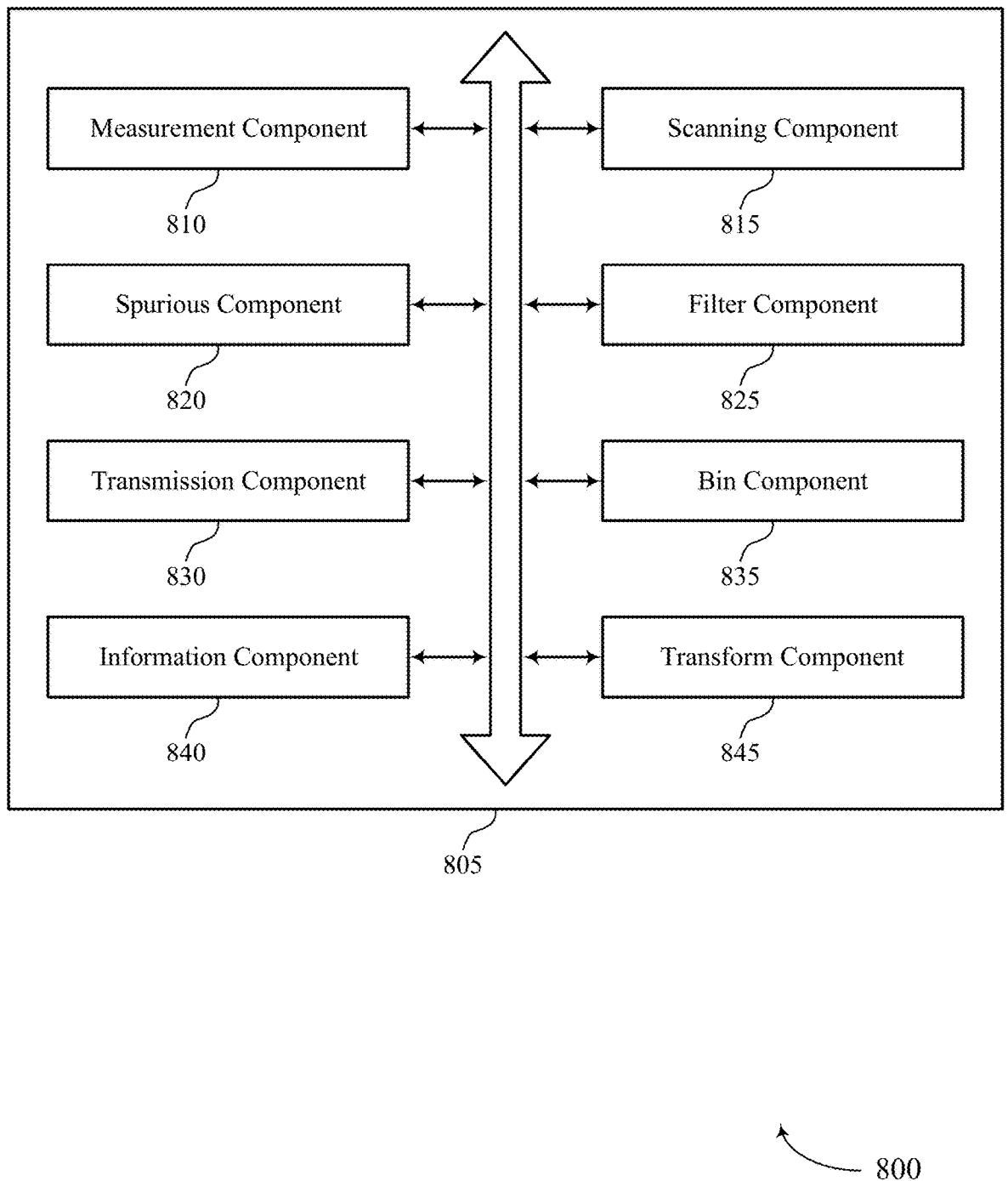
FIG. 8 shows a block diagram of a spur manager that supports spur identification and mitigation in wireless communications systems in accordance with aspects of the present disclosure.

FIG. 8 shows a block diagram 800 of a device 805 that supports spur identification and mitigation in wireless communications systems in accordance with aspects of the present disclosure. The device 805 may be an example of aspects of a device 705 or a device 115 as described herein. The device 805 may include a receiver 810, a communications manager 815, and a transmitter 845. The communications manager 815 may include a spur manager 816. The device 805 may also include a processor. Each of these components may be in communication with one another (e.g., via one or more buses).

The receiver 810 may receive information such as packets, user data, or control information associated with various information channels (e.g., control channels, data channels, and information related to spur identification and mitigation in wireless communications systems, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The spur manager 816 may be an example of aspects of the spur manager 716 as described herein. The spur manager 816 may include a measurement component 820, a scanning component 825, a spurious component 830, a filter component 835, and a transmission component 840. The communications manager 815 may be an example of aspects of the communications manager 1010 described herein. The spur manager 816 may be an example of aspects of the spur manager 1011 as described herein.

The measurement component 820 may determine, based on a first frequency scan on an RF spectrum band, that a signal strength of a signal at a frequency of the RF spectrum band satisfies a threshold. The scanning component 825 may perform, based on the first frequency scan on the RF spectrum band, a second frequency scan on the RF spectrum band to determine whether the signal strength of the signal at the frequency of the RF spectrum band satisfies the threshold during the second frequency scan. The spurious component 830 may determine that the signal is a spurious emission at the frequency based on the signal strength of the signal satisfying the threshold during one or more of the first frequency scan and the second frequency scan. The filter component 835 may configure a notch filter based on the spurious emission at the frequency. The transmission component 840 may receive a transmission from a second device over the RF spectrum band based on the notch filter. Accordingly, the described spur identification and mitigation techniques may promote dynamic identification of spurious emissions and configuration of notch filters for mitigating the identified spurious emissions, without user interaction, among other advantages.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
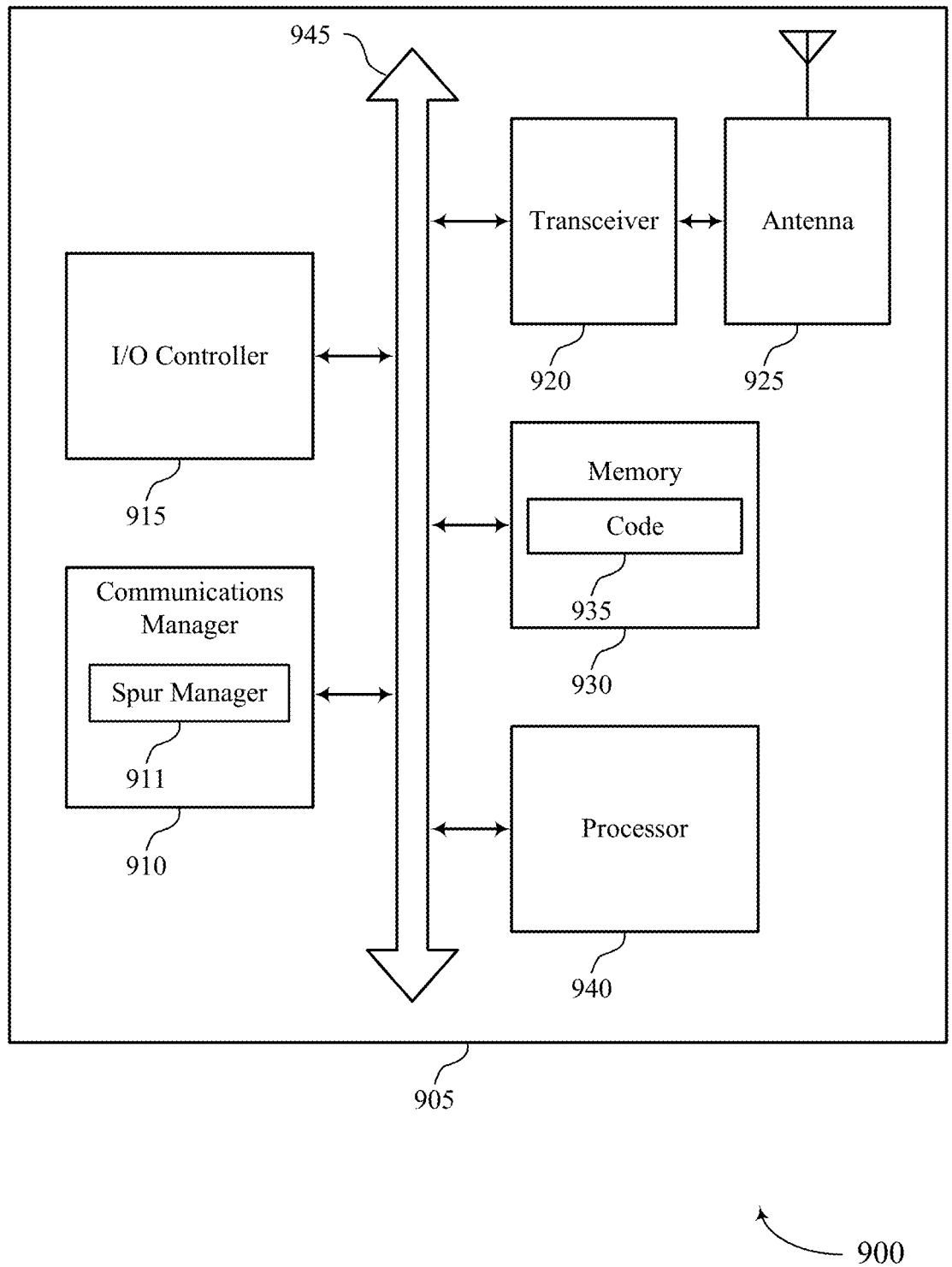
FIG. 9 shows a diagram of a system including a device that supports spur identification and mitigation in wireless communications systems in accordance with aspects of the present disclosure.

FIG. 9 shows a block diagram 900 of a spur manager 905 that supports spur identification and mitigation in wireless communications systems in accordance with aspects of the present disclosure. The spur manager 905 may be an example of aspects of a spur manager 716, a spur manager 816, or a spur manager 1011 described herein. The spur manager 905 may include a measurement component 910, a scanning component 915, a spurious component 920, a filter component 925, a transmission component 930, a bin component 935, an information component 940, and a transform component 945. Each of these modules may communicate, directly or indirectly, with one another (e.g., via one or more buses).

The measurement component 910 may determine, based on a first frequency scan on an RF spectrum band, that a signal strength of a signal at a frequency of the RF spectrum band satisfies a threshold. In some examples, the measurement component 910 may determine that the signal strength of the signal at a second frequency of the RF spectrum band satisfies the threshold during a second frequency scan. In some examples, the measurement component 910 may determine a frequency difference between the frequency and the second frequency. In some examples, the measurement component 910 may determine that the frequency difference satisfies one or more of a second threshold and is within a bandwidth of the notch filter. In some examples, the measurement component 910 may determine, based on the first frequency scan, that the signal strength of the second signal at a second frequency of the RF spectrum band satisfies the threshold. In some examples, the measurement component 910 may determine, based on the second frequency scan, that the signal strength of the second signal at the second frequency of the RF spectrum band is below the threshold.

The scanning component 915 may perform, based on the first frequency scan on the RF spectrum band, the second frequency scan on the RF spectrum band to determine whether the signal strength of the signal at the frequency of the RF spectrum band satisfies the threshold during the second frequency scan. In some examples, the scanning component 915 may perform the first frequency scan on the RF spectrum band based on the transforming. In some examples, the scanning component 915 may perform the second frequency scan is based on transforming the signal from the time domain to the frequency domain.

The spurious component 920 may determine that the signal is a spurious emission at the frequency based on the signal strength of the signal satisfying the threshold during one or more of the first frequency scan and the second frequency scan. In some examples, the spurious component 920 may determine the spurious emission at the frequency based on the comparing. In some examples, the spurious component 920 may identify the second signal as a second spurious emission at the second frequency based on one or more of the second signal satisfying the threshold during first frequency scan and being below the threshold during the second frequency scan.

The filter component 925 may configure a notch filter based on the spurious emission at the frequency. In some examples, configuring the notch filter may include dynamically configuring the notch filter based on determining that the signal is the spurious emission at the frequency. In some examples, the filter component 925 may configure the notch filter further based on one or more of the signal strength of the signal satisfying the threshold during one or more of the first frequency scan and the second frequency scan and the frequency difference satisfying one or more of the second threshold and being within the bandwidth of the notch filter. In some examples, the filter component 925 may attenuate the spurious emission at the frequency of the RF spectrum band using the notch filter. In some examples, the filter component 925 may process the second spurious emission using a baseband filter based on the identifying. In some examples, the filter component 925 may determine one or more filter coefficients of the notch filter based on the frequency associated with the signal determined as the spurious emission and the signal strength of the signal. In some examples, the filter component 925 may configure the notch filter further based on determining the one or more filter coefficients of the notch filter. In some examples, configuring the notch filter may include configuring an attenuation level based on the one or more filter coefficients of the notch filter.

The transmission component 930 may receive a transmission from a second device over the RF spectrum band based on the notch filter. The bin component 935 may store, to a frequency bin of a set of frequency bins, amplitude information associated with the signal at the frequency of the RF spectrum band during one or more of the first frequency scan and the second frequency scan. The information component 940 may compare the stored amplitude information of the frequency bin of the set of frequency bins associated with the signal at the frequency of the RF spectrum band during the first frequency scan to additional amplitude information of an additional frequency bin of the set of frequency bins associated with the signal at the frequency of the RF spectrum band during the second frequency scan. The transform component 945 may transform the signal from a time domain to a frequency domain based on a transform operation.

Figure 10:
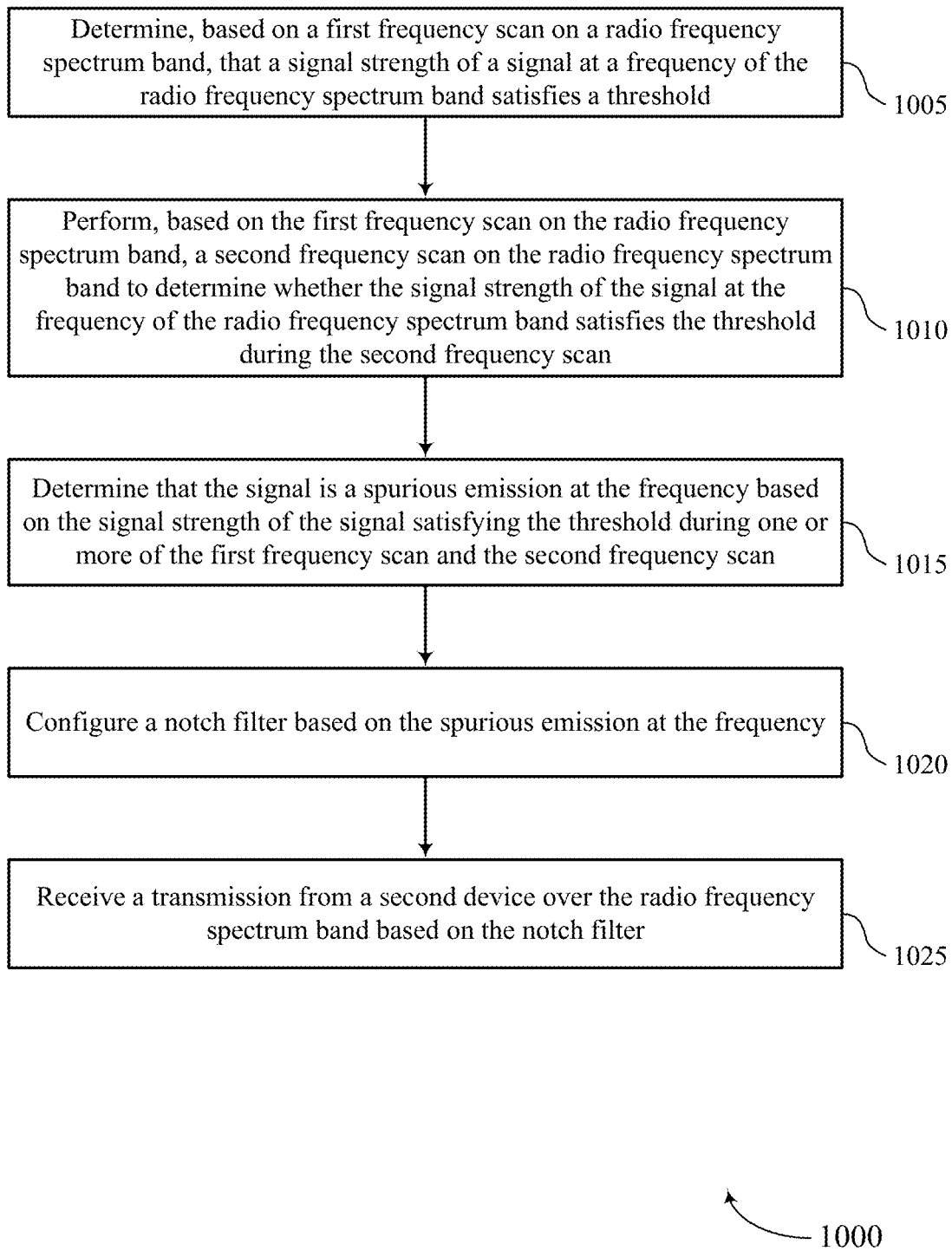
FIGS. 10 and 11 show flowcharts illustrating methods that support spur identification and mitigation in wireless communications systems in accordance with aspects of the present disclosure.

FIG. 10 shows a diagram of a system 1000 including a device 1005 that supports spur identification and mitigation in wireless communications systems in accordance with aspects of the present disclosure. The device 1005 may be an example of or include the components of device 705, device 805, or a device as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. The communications manager 1010 may include a spur manager 1011. These components may be in electronic communication via one or more buses (e.g., bus 1045).

The communications manager 1010 may determine (e.g., by the spur manager 1011), based on a first frequency scan on an RF spectrum band, that a signal strength of a signal at a frequency of the RF spectrum band satisfies a threshold, perform, based on the first frequency scan on the RF spectrum band, a second frequency scan on the RF spectrum band to determine whether the signal strength of the signal at the frequency of the RF spectrum band satisfies the threshold during the second frequency scan, determine that the signal is a spurious emission at the frequency based on the signal strength of the signal satisfying the threshold during one or more of the first frequency scan and the second frequency scan, configure a notch filter based on the spurious emission at the frequency, and receive a transmission from a second device over the RF spectrum band based on the notch filter.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS, ANDROID, MS-DOS, MS-WINDOWS, OS/2, UNIX, LINUX, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases the device 1005 may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting spur identification and mitigation in wireless communications systems).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
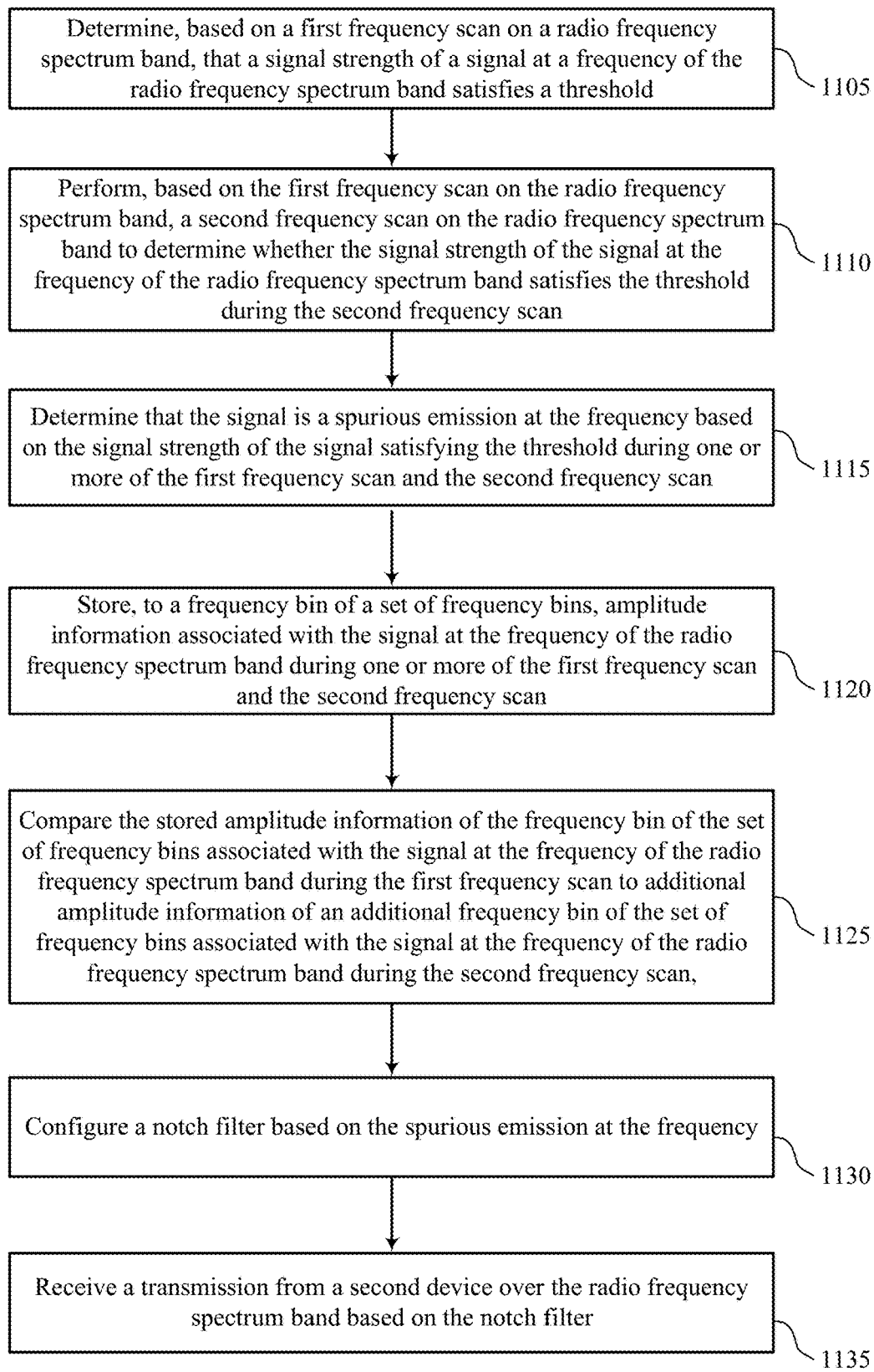

FIG. 11 shows a flowchart illustrating a method 1100 that supports spur identification and mitigation in wireless communications systems in accordance with aspects of the present disclosure. The operations of method 1100 may be implemented by a device or its components as described herein. For example, the operations of method 1100 may be performed by a spur manager as described with reference to FIGS. 7 through 10. In some examples, a device may execute a set of instructions to control the functional elements of the device to perform the functions described herein. Additionally or alternatively, a device may perform aspects of the functions described herein using special-purpose hardware.

At 1105, the device may determine, based on a first frequency scan on an RF spectrum band, that a signal strength of a signal at a frequency of the RF spectrum band satisfies a threshold. The operations of 1105 may be performed according to the methods described herein. In some examples, aspects of the operations of 1105 may be performed by a measurement component as described with reference to FIGS. 7 through 10.

At 1110, the device may perform, based on the first frequency scan on the RF spectrum band, a second frequency scan on the RF spectrum band to determine whether the signal strength of the signal at the frequency of the RF spectrum band satisfies the threshold during the second frequency scan. The operations of 1110 may be performed according to the methods described herein. In some examples, aspects of the operations of 1110 may be performed by a scanning component as described with reference to FIGS. 7 through 10.

At 1115, the device may determine that the signal is a spurious emission at the frequency based on the signal strength of the signal satisfying the threshold during one or more of the first frequency scan and the second frequency scan. The operations of 1115 may be performed according to the methods described herein. In some examples, aspects of the operations of 1115 may be performed by a spurious component as described with reference to FIGS. 7 through 10.

At 1120, the device may configure a notch filter based on the spurious emission at the frequency. The operations of 1120 may be performed according to the methods described herein. In some examples, aspects of the operations of 1120 may be performed by a filter component as described with reference to FIGS. 7 through 10.

At 1125, the device may receive a transmission from a second device over the RF spectrum band based on the notch filter. The operations of 1125 may be performed according to the methods described herein. In some examples, aspects of the operations of 1125 may be performed by a transmission component as described with reference to FIGS. 7 through 10. Accordingly, the described operations of method 1100 as implemented by the device or its components may promote dynamic identification of spurious emissions and configuration of notch filters for mitigating the identified spurious emissions, without user interaction, among other advantages.

FIG. 12 shows a flowchart illustrating a method 1200 that supports spur identification and mitigation in wireless communications systems in accordance with aspects of the present disclosure. The operations of method 1200 may be implemented by a device or its components as described herein. For example, the operations of method 1200 may be performed by a spur manager as described with reference to FIGS. 7 through 10. In some examples, a device may execute a set of instructions to control the functional elements of the device to perform the functions described herein. Additionally or alternatively, a device may perform aspects of the functions described herein using special-purpose hardware.

At 1205, the device may determine, based on a first frequency scan on a radio frequency spectrum band, that a signal strength of a signal at a frequency of the RF spectrum band satisfies a threshold. The operations of 1205 may be performed according to the methods described herein. In some examples, aspects of the operations of 1205 may be performed by a measurement component as described with reference to FIGS. 7 through 10.

At 1210, the device may perform, based on the first frequency scan on the RF spectrum band, a second frequency scan on the RF spectrum band to determine whether the signal strength of the signal at the frequency of the RF spectrum band satisfies the threshold during the second frequency scan. The operations of 1210 may be performed according to the methods described herein. In some examples, aspects of the operations of 1210 may be performed by a scanning component as described with reference to FIGS. 7 through 10.

At 1215, the device may determine that the signal is a spurious emission at the frequency based on the signal strength of the signal satisfying the threshold during one or more of the first frequency scan and the second frequency scan. The operations of 1215 may be performed according to the methods described herein. In some examples, aspects of the operations of 1215 may be performed by a spurious component as described with reference to FIGS. 7 through 10.

At 1220, the device may store, to a frequency bin of a set of frequency bins, amplitude information associated with the signal at the frequency of the RF spectrum band during one or more of the first frequency scan and the second frequency scan. The operations of 1220 may be performed according to the methods described herein. In some examples, aspects of the operations of 1220 may be performed by a bin component as described with reference to FIGS. 7 through 10.

At 1225, the device may compare the stored amplitude information of the frequency bin of the set of frequency bins associated with the signal at the frequency of the RF spectrum band during the first frequency scan to additional amplitude information of an additional frequency bin of the set of frequency bins associated with the signal at the frequency of the RF spectrum band during the second frequency scan. The operations of 1225 may be performed according to the methods described herein. In some examples, aspects of the operations of 1225 may be performed by an information component as described with reference to FIGS. 7 through 10.

At 1230, the device may configure a notch filter based on the spurious emission at the frequency. The operations of 1230 may be performed according to the methods described herein. In some examples, aspects of the operations of 1230 may be performed by a filter component as described with reference to FIGS. 7 through 10.

At 1235, the device may receive a transmission from a second device over the RF spectrum band based on the notch filter. The operations of 1235 may be performed according to the methods described herein. In some examples, aspects of the operations of 1235 may be performed by a transmission component as described with reference to FIGS. 7 through 10. Accordingly, the described operations of method 1200 as implemented by the device or its components may promote dynamic identification of spurious emissions and configuration of notch filters for mitigating the identified spurious emissions, without user interaction, among other advantages.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device, comprising:
    determining, based at least in part on a first frequency scan on a radio frequency spectrum band, that a signal strength of a signal at a frequency of the radio frequency spectrum band satisfies a threshold;
    performing, based at least in part on the first frequency scan on the radio frequency spectrum band, a second frequency scan on the radio frequency spectrum band to determine whether the signal strength of the signal at the frequency of the radio frequency spectrum band satisfies the threshold during the second frequency scan;
    determining that the signal is a spurious emission at the frequency based at least in part on the signal strength of the signal satisfying the threshold during one or more of the first frequency scan and the second frequency scan;
    configuring a notch filter based at least in part on the spurious emission at the frequency; and
    receiving a transmission from a second device over the radio frequency spectrum band based at least in part on the notch filter.

2. The method of claim 1, wherein configuring the notch filter comprises dynamically configuring the notch filter based at least in part on determining that the signal is the spurious emission at the frequency.

3. The method of claim 1, further comprising:
    storing, to a frequency bin of a set of frequency bins, amplitude information associated with the signal at the frequency of the radio frequency spectrum band during one or more of the first frequency scan and the second frequency scan; and
    comparing the stored amplitude information of the frequency bin of the set of frequency bins associated with the signal at the frequency of the radio frequency spectrum band during the first frequency scan to additional amplitude information of an additional frequency bin of the set of frequency bins associated with the signal at the frequency of the radio frequency spectrum band during the second frequency scan,
    wherein determining the spurious emission at the frequency is based at least in part on the comparing.

4. The method of claim 1, further comprising:
    determining that the signal strength of the signal at a second frequency of the radio frequency spectrum band satisfies the threshold during the second frequency scan;
    determining a frequency difference between the frequency and the second frequency; and
    determining that the frequency difference satisfies one or more of a second threshold and is within a bandwidth of the notch filter,
    wherein configuring the notch filter is further based at least in part on one or more of the signal strength of the signal satisfying the threshold during one or more of the first frequency scan and the second frequency scan, and the frequency difference satisfying one or more of the second threshold and being within the bandwidth of the notch filter.

5. The method of claim 1, further comprising:
    attenuating the spurious emission at the frequency of the radio frequency spectrum band using the notch filter.

6. The method of claim 1, further comprising:
    transforming the signal from a time domain to a frequency domain based at least in part on a transform operation; and
    performing the first frequency scan on the radio frequency spectrum band based at least in part on the transforming.

7. The method of claim 6, wherein performing the second frequency scan is based at least in part on transforming the signal from the time domain to the frequency domain.

8. The method of claim 1, further comprising:
    determining, based at least in part on the first frequency scan, that a signal strength of a second signal at a second frequency of the radio frequency spectrum band satisfies the threshold;
    determining, based at least in part on the second frequency scan, that the signal strength of the second signal at the second frequency of the radio frequency spectrum band is below the threshold;
    identifying the second signal as a second spurious emission at the second frequency based at least in part on one or more of the second signal satisfying the threshold during the first frequency scan and being below the threshold during the second frequency scan; and
    processing the second spurious emission using a baseband filter based at least in part on the identifying.

9. The method of claim 1, further comprising:
    determining one or more filter coefficients of the notch filter based at least in part on the frequency associated with the signal determined as the spurious emission and the signal strength of the signal,
    wherein configuring the notch filter is further based at least in part on determining the one or more filter coefficients of the notch filter.

10. The method of claim 9, wherein configuring the notch filter comprises configuring an attenuation level based at least in part on the one or more filter coefficients of the notch filter.

11. An apparatus for wireless communications, comprising:
    a processor,
    memory coupled with the processor; and
    instructions stored in the memory and executable by the processor to cause the apparatus to:
        determine, based at least in part on a first frequency scan on a radio frequency spectrum band, that a signal strength of a signal at a frequency of the radio frequency spectrum band satisfies a threshold;
        perform, based at least in part on the first frequency scan on the radio frequency spectrum band, a second frequency scan on the radio frequency spectrum band to determine whether the signal strength of the signal at the frequency of the radio frequency spectrum band satisfies the threshold during the second frequency scan;
        determine that the signal is a spurious emission at the frequency based at least in part on the signal strength of the signal satisfying the threshold during one or more of the first frequency scan and the second frequency scan;

configure a notch filter based at least in part on the spurious emission at the frequency; and receive a transmission from a second apparatus over the radio frequency spectrum band based at least in part on the notch filter.

12. The apparatus of claim 11, wherein the instructions to configure the notch filter are further executable by the processor to cause the apparatus to dynamically configure the notch filter based at least in part on determining that the signal is the spurious emission at the frequency.

13. The apparatus of claim 11, wherein the instructions are further executable by the processor to cause the apparatus to:

store, to a frequency bin of a set of frequency bins, amplitude information associated with the signal at the frequency of the radio frequency spectrum band during one or more of the first frequency scan and the second frequency scan; and compare the stored amplitude information of the frequency bin of the set of frequency bins associated with the signal at the frequency of the radio frequency spectrum band during the first frequency scan to additional amplitude information of an additional frequency bin of the set of frequency bins associated with the signal at the frequency of the radio frequency spectrum band during the second frequency scan, wherein the instructions to determine the spurious emission at the frequency are based at least in part on the comparing.

14. The apparatus of claim 11, wherein the instructions are further executable by the processor to cause the apparatus to:

attenuate the spurious emission at the frequency of the radio frequency spectrum band using the notch filter.

15. The apparatus of claim 11, wherein the instructions are further executable by the processor to cause the apparatus to:

transform the signal from a time domain to a frequency domain based at least in part on a transform operation; and perform the first frequency scan on the radio frequency spectrum band based at least in part on the transforming.

16. The apparatus of claim 15, wherein the instructions to perform the second frequency scan are further executable by the processor to cause the apparatus to transform the signal from the time domain to the frequency domain.

17. The apparatus of claim 11, wherein the instructions are further executable by the processor to cause the apparatus to:

determine, based at least in part on the first frequency scan, that a signal strength of a second signal at a second frequency of the radio frequency spectrum band satisfies the threshold;

determine, based at least in part on the second frequency scan, that the signal strength of the second signal at the second frequency of the radio frequency spectrum band is below the threshold;

identify the second signal as a second spurious emission at the second frequency based at least in part on one or more of the second signal satisfying the threshold during the first frequency scan and being below the threshold during the second frequency scan; and process the second spurious emission using a baseband filter based at least in part on the identifying.

18. The apparatus of claim 11, wherein the instructions are further executable by the processor to cause the apparatus to:

determine one or more filter coefficients of the notch filter based at least in part on the frequency associated with the signal determined as the spurious emission and the signal strength of the signal, wherein the instructions to configure the notch filter are based at least in part on determining the one or more filter coefficients of the notch filter.

19. The apparatus of claim 18, wherein the instructions to configure the notch filter are further executable by the processor to cause the apparatus to configure an attenuation level based at least in part on the one or more filter coefficients of the notch filter.

20. An apparatus for wireless communications, comprising:

means for determining, based at least in part on a first frequency scan on a radio frequency spectrum band, that a signal strength of a signal at a frequency of the radio frequency spectrum band satisfies a threshold;

means for performing, based at least in part on the first frequency scan on the radio frequency spectrum band, a second frequency scan on the radio frequency spectrum band to determine whether the signal strength of the signal at the frequency of the radio frequency spectrum band satisfies the threshold during the second frequency scan;

means for determining that the signal is a spurious emission at the frequency based at least in part on the signal strength of the signal satisfying the threshold during one or more of the first frequency scan and the second frequency scan;

means for configuring a notch filter based at least in part on the spurious emission at the frequency; and means for receiving a transmission from a second apparatus over the radio frequency spectrum band based at least in part on the notch filter.

* * * * *